(12) United States Patent
Khalid et al.

(10) Patent No.: US 10,867,446 B2
(45) Date of Patent: Dec. 15, 2020

(54) SYSTEMS AND METHODS FOR DYNAMICALLY CREATING A CUSTOM VIRTUAL WORLD

(71) Applicant: Verizon Patent and Licensing Inc., Arlington, VA (US)

(72) Inventors: Mohammad Raheel Khalid, Budd Lake, NJ (US); Craig Elliott Brown, White Plains, NY (US); Joseph M. Knight, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 24 days.

(21) Appl. No.: 16/141,771

(22) Filed: Sep. 25, 2018

(65) Prior Publication Data

US 2020/0098180 A1   Mar. 26, 2020

(51) Int. Cl.
*G06T 19/00* (2011.01)
*G06T 17/20* (2006.01)

(52) U.S. Cl.
CPC ............ *G06T 19/006* (2013.01); *G06T 17/20* (2013.01); *G06T 19/003* (2013.01); *G06T 2219/2008* (2013.01)

(58) Field of Classification Search
None
See application file for complete search history.

(56) References Cited

U.S. PATENT DOCUMENTS

| 10,115,149 | B1* | 10/2018 | Deem ................... G06T 19/006 |
| 2016/0148433 | A1* | 5/2016 | Petrovskaya ......... G06T 19/006 345/633 |
| 2016/0299563 | A1* | 10/2016 | Stafford ............... G02B 27/017 |
| 2018/0286268 | A1* | 10/2018 | Ni ........................... G06F 3/011 |

* cited by examiner

*Primary Examiner* — Yi Wang

(57) ABSTRACT

An exemplary method includes a virtual world creation system detecting a request from a user of a user computing device to experience a three-dimensional (3D) virtual world, dynamically generating, in response to the request, a 3D mesh that defines a structure of a custom 3D virtual world to be experienced by the user, and providing, by the virtual world creation system, the custom 3D virtual world for experiencing by the user. The generating of the custom 3D virtual world includes selecting, based on profile information for the user and a set of virtual world building rules, a custom set of modules for inclusion in the custom 3D virtual world, and using the selected custom set of modules to generate the 3D mesh based on the set of virtual world building rules.

18 Claims, 13 Drawing Sheets

SYSTEMS AND METHODS FOR DYNAMICALLY CREATING A CUSTOM VIRTUAL WORLD

BACKGROUND INFORMATION

A virtual world is a computer-based simulated environment that may be presented, by a computing device, to a user of the computing device. The user of the computing device typically provides input to interact with the virtual world being presented, such as by arbitrarily moving a virtual vantage point, and thus a field of view, within the virtual world. The virtual world may be presented as part of an extended reality experience, such as a virtual reality experience or an augmented reality experience, for example.

Conventionally, a virtual world is defined by its creators in advance of the virtual world being requested and provided for presentation. In particular, the structure of the virtual world is traditionally defined in advance of the virtual world being requested and provided for presentation.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
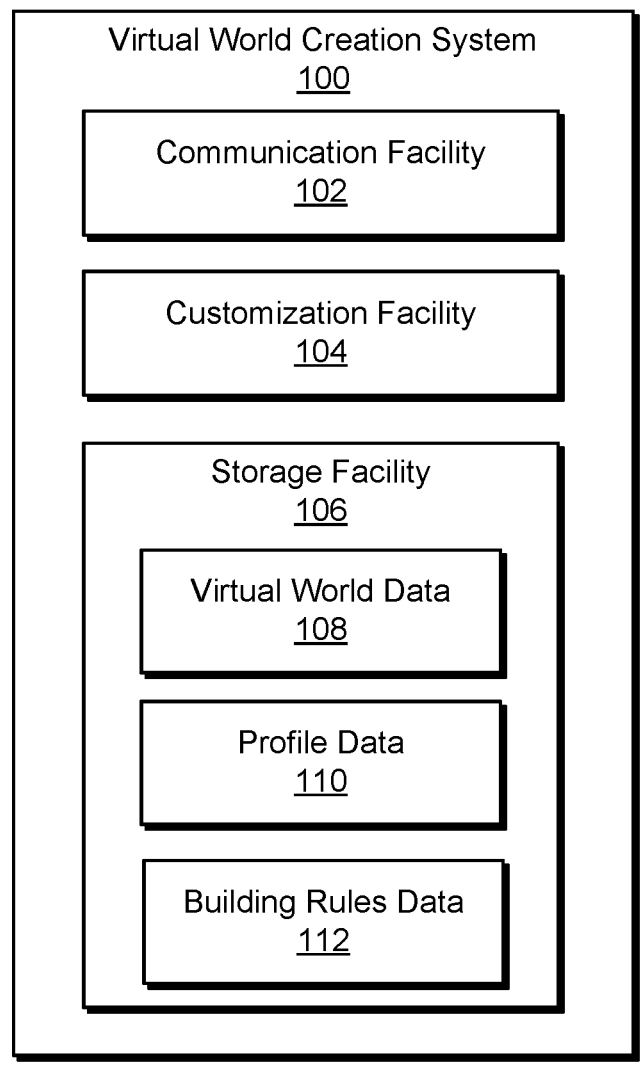
FIG. 1 illustrates an exemplary virtual world creation system according to principles described herein.

Exemplary virtual world creation systems and methods are described herein. The virtual world creation systems and methods described herein dynamically create custom virtual worlds. For example, a virtual world creation system detects a request from a user of a user computing device to experience a three-dimensional (3D) virtual world and, in response to the request, dynamically generates and provides a custom 3D virtual world for experiencing by the user. The virtual world creation system dynamically generates the custom 3D virtual world by selecting a custom set of modules for inclusion in the custom 3D virtual world and using the selected custom set of modules to generate the custom 3D virtual world. The virtual world creation system selects the custom set of modules and uses the custom set of modules to generate the custom 3D virtual world based on profile information for the user and a set of virtual building rules.

The dynamic generation of the custom 3D virtual world may include dynamically generating a 3D mesh that defines a structure of the custom 3D virtual world. For example, the selected custom set of modules may be used (e.g., joined together or positioned relative one to another) to generate the 3D mesh based on the set of virtual world building rules. The 3D mesh may be one cohesive mesh or a plurality of independent meshes positioned relative one to another to define the structure of the custom 3D virtual world. The structure of the custom 3D virtual world may define a user-navigable virtual 3D space within the custom 3D virtual world. Examples of a dynamically-generated 3D mesh and structure of a custom 3D virtual world are described herein.

In certain examples, the virtual world creation systems and methods described herein may dynamically generate and provide different and separate custom 3D virtual worlds for experiencing by respective users on a single server session. The virtual world creation systems and methods may also dynamically generate a 3D virtual connection between the different custom 3D virtual worlds. The 3D virtual connection, which may be a custom 3D virtual connection, may be configured to facilitate navigation by the users between the different custom 3D virtual worlds during the single server session.

Virtual world creation systems and methods described herein facilitate providing of dynamically generated and customized 3D virtual worlds, which may facilitate improved and/or customized user experiences with 3D virtual worlds as compared to user experiences with conventional virtual worlds that are defined in advance of being requested and provided for presentation. Such dynamic generation of custom 3D virtual worlds may facilitate real time or on-the-fly creation of a variety of custom 3D virtual worlds (e.g., fully customized 3D virtual worlds that include custom, dynamically generated world structures and spaces) from a single world set of modules. Thus, a single world set of modules may be defined for a virtual world and used to generate personalized, remixed versions of the virtual world. This may conserve computing resources (e.g., memory resources) and/or virtual world designer and developer resources at least by not requiring separate sets of data to be defined in advance and maintained for different virtual worlds.

Systems and methods described herein may provide additional or alternative features and benefits as may serve a particular implementation. Various embodiments will now be described with reference to the figures. The disclosed embodiments may provide one or more of the features and benefits mentioned above and/or various additional and/or alternative features and benefits that will be made apparent herein.

FIG. 1 illustrates an exemplary virtual world creation system 100 ("system 100"). As shown, system 100 may include, without limitation, a communication facility 102, a customization facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. Each of facilities 102 through 106 may be implemented on a single computing device or may be distributed between multiple devices and/or multiple locations as may serve a particular implementation. Additionally, one or more of facilities 102 through 106 may be omitted from system 100 in certain implementations, while additional facilities may be included within system 100 in the same or other implementations.

Each of facilities 102 through 106 may include or be implemented by one or more physical computing devices such as hardware and/or software components (e.g., processors, memories, communication interfaces, instructions stored in memory for execution by the processors, etc.). For instance, the facilities may be implemented using separate computing components unique to each facility or may be implemented using shared computing components. Each of facilities 102 through 106 will now be described in more detail.

Communication facility 102 may be configured to perform various operations associated with receiving and/or providing data internal and/or external to system 100. For example, communication facility 102 may receive a communication from a user computing device, the communication representing a request by a user of the user computing device to experience a 3D virtual world. Communication facility 102 may provide the received request to customization facility 104. Communication facility 102 may also transmit data representing a custom 3D virtual world dynamically generated by customization facility 104 to the user computing device for presentation by the user computing device and experiencing by the user.

Communication facility 102 may employ any communication technologies suitable for receiving and providing such communications. In certain implementations, for example, communication facility 102 may employ technologies for sending and receiving communications over a network, which network may include a wireless communication network, a wired communication network, a wide area network, a local area network, any other suitable communication network, or any combination or sub-combination thereof. In other implementations, communication facility 102 may employ technologies for sending and receiving communications directly to/from a user computing device without use of a network.

While FIG. 1 illustrates an implementation in which system 100 includes communication facility 102, in other implementations communication facility 102 may be omitted from and communicatively coupled to system 100. In such other implementations, system 100 may include customization facility 104 and storage facility 106. In yet other implementations, storage facility 106 may also be omitted from and communicatively coupled to system 100 such that system 100 includes customization facility 104 only, and customization facility 104 is configured to communicate with communication facility 102 and storage facility 106 that are implemented external of system 100.

Customization facility 104 may detect a request from a user of a user computing device to experience a 3D virtual world. Customization facility 104 may detect the request in any suitable way. In certain implementations, customization facility 104 detects the request by receiving the request from communication facility 102. The request may be in any suitable form and may indicate a request by the user of the user computing device to experience a 3D virtual world.

In response to the request, customization facility 104 may dynamically generate a custom 3D virtual world to be experienced by the user. The dynamic generation of the custom 3D virtual world may include customization facility 104 selecting, based on profile information for the user and a set of virtual world building rules, a custom set of modules for inclusion in the custom 3D virtual world, and using the selected custom set of modules to generate the custom 3D virtual world based on the set of virtual world building rules.

The dynamic generation of the custom 3D virtual world may include customization facility 104 dynamically generating a 3D mesh that defines a structure of the custom 3D virtual world. For example, the selected custom set of modules may be used to generate the 3D mesh based on the set of virtual world building rules. Dynamic generation of the 3D mesh may include customization facility 104 performing operations on the modules included in the selected custom set of modules, such as positioning modules relative one to another in a 3D space, joining modules, sizing modules (e.g., extending, shortening, and/or magnifying modules), orienting modules (e.g., rotating modules), cropping modules, and/or otherwise performing operations on the selected custom set of modules to generate a 3D mesh that defines a structure of a custom 3D virtual world.

A 3D mesh dynamically generated by customization facility 104 may be one cohesive mesh or a plurality of independent meshes positioned relative one to another to define the structure of the custom 3D virtual world. The structure of the custom 3D virtual world may define a user-navigable virtual 3D space within the custom 3D virtual world. For example, the structure of the custom 3D virtual world may include virtual objects arranged to form non-navigable components of the custom 3D virtual world such as outer boundaries (e.g., terrain, walls, etc.), internal boundaries (e.g., a body of water, etc.), internal objects (e.g., virtual objects such as trees, rocks, furniture, etc.), and/or other such components that may be included in a 3D virtual world. Customization facility 104 may position such non-navigable components relative to one another in a 3D space to as to form a user-navigable virtual 3D space within the custom 3D virtual world (e.g., a room within a building, a space that is walkable by an avatar in the custom 3D virtual world, etc.).

In certain examples, customization facility 104 may dynamically generate and provide different custom 3D virtual worlds for experiencing by respective users in a single server session. In such a session, customization facility 104 may dynamically generate a 3D virtual connection between the different custom 3D virtual worlds. The 3D virtual connection, which may be a custom 3D virtual connection, may be configured to facilitate navigation by the users between the different custom 3D virtual worlds during the single server session.

Examples of operations that may be performed by customization facility 104 to dynamically generate a custom 3D virtual world, as well as examples of operations that may be performed by customization facility 104 to dynamically generate a 3D virtual connection between custom 3D virtual worlds are described in detail herein.

Customization facility 104 may provide a dynamically-generated custom 3D virtual world for experiencing by a user. For example, customization facility 104 may provide the custom 3D virtual world to communication facility 102, which may transmit data representative of the custom 3D virtual world to a user computing device configured to process the data and present the custom 3D virtual world to the user.

The providing of the custom 3D virtual world for experiencing by the user may include providing data representative of the entire custom 3D virtual world or only a portion of the custom 3D virtual world (e.g., a portion of the custom 3D virtual world that is associated with a particular virtual vantage point and/or field of view within the custom 3D virtual world). In certain examples, the providing of the custom 3D virtual world may include system 100 streaming, in real time in response to the request for the 3D virtual world, data representative of the dynamically generated custom 3D virtual world over a network to the user computing device for real-time processing and presentation by the user computing device.

Storage facility 106 may include a data store configured to store data in a computer-readable format. Storage facility 106 may store virtual world data 108, profile data 110, building rules data 112, and/or any other data received, generated, managed, maintained, used, and/or transmitted by facilities 102 and 104.

Virtual world data 108 may include any data representative of a virtual world such as a custom 3D virtual world generated by customization facility 104 and/or elements that may be used by customization facility 104 to generate a custom 3D virtual world. For example, virtual world data 108 may include a set of modules that have been defined (e.g., by one or more module designers) for selection and use by customization facility 104 to create a custom 3D virtual world. Examples of such modules are described herein.

Profile data 110 may include any information associated with a user who is requesting to experience a virtual world. For example, profile data 110 may include information included in a user profile for the user. The profile information for the user may be accessed, generated, and/or maintained by system 100. Examples of profile information and how profile information may be used by customization facility 104 are described herein.

Building rules data 112 may represent a set of predefined virtual world building rules configured to be used by customization facility 104 to generate a custom 3D virtual world. The set of virtual world building rules may include rules to be followed by customization facility 104 to select a custom set of modules and/or to build a custom 3D virtual world using a selected custom set of modules. For example, the set of virtual world building rules may be used by customization facility 104 to determine how to position modules relative one to another in a 3D space, join modules, size modules (e.g., extend, shorten, and/or magnify modules), orient modules (e.g., rotate modules), crop modules, and/or otherwise perform operations on the selected custom set of modules to generate a 3D mesh that defines a structure of a custom 3D virtual world. Examples of virtual world building rules that may be used by customization facility 104 to generate a custom 3D virtual world are described herein.

Examples of customization facility 104 dynamically generating a custom 3D virtual world from an exemplary world set of defined modules associated with a virtual world in the form of a wireless service provider virtual store will now be described. Principles and operations described in the context of these examples may similarly apply to other world sets of modules associated with other virtual worlds.

Figure 2:
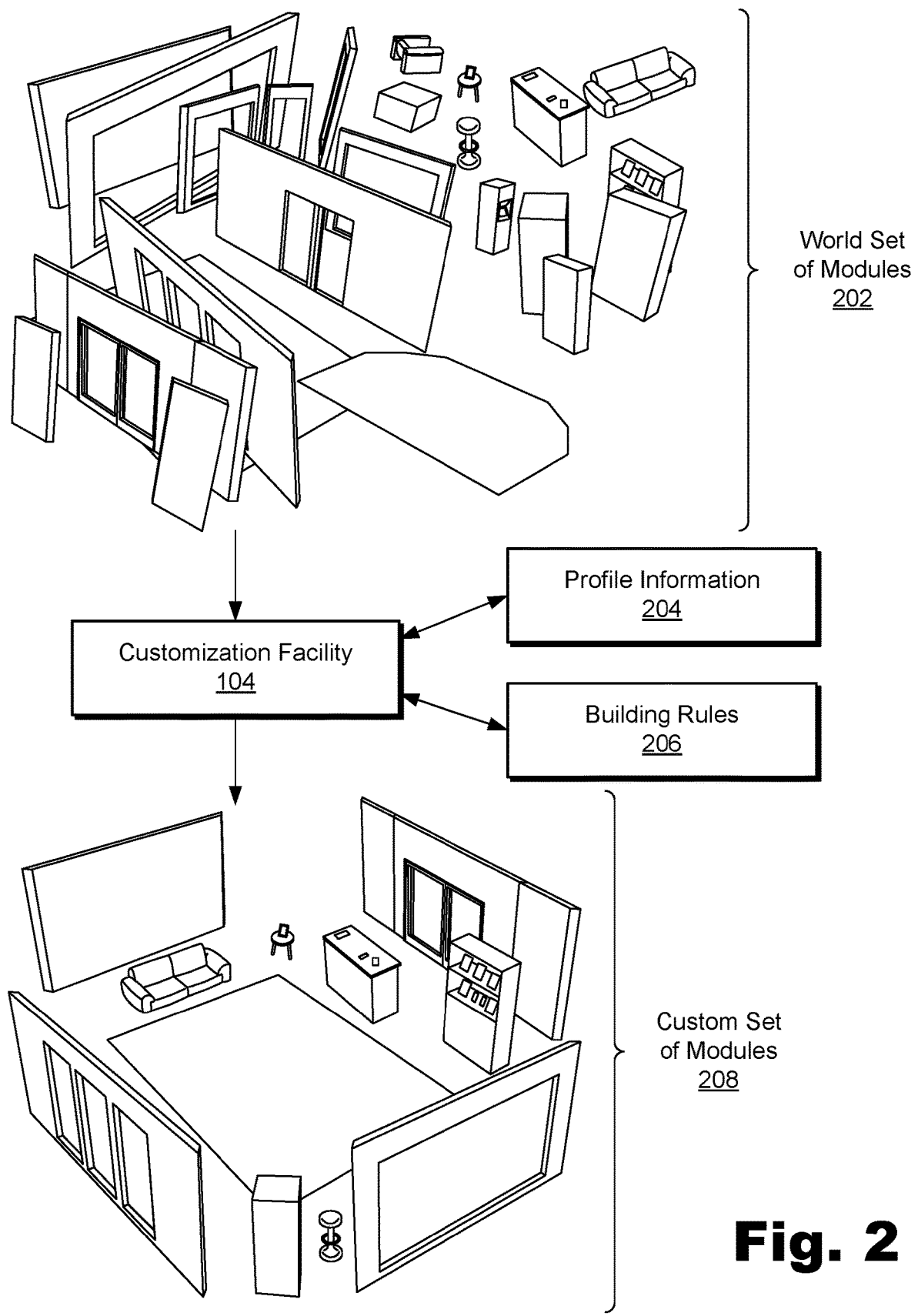
FIG. 2 illustrates an exemplary selection of a custom set of modules for inclusion in a custom three-dimensional (3D) virtual world according to principles described herein.

FIG. 2 illustrates an exemplary selection of a custom set of modules for inclusion in a custom 3D virtual world. As shown, a world set of modules 202 may be defined and may include potential components of a virtual world. For example, the world set of modules 202 may include various defined instances of floors, ceilings, walls, doors, entryways, windows, furniture (e.g., couches, chairs, stools, tables, etc.), counters, fixtures (e.g., light fixtures), electrical outlets and switches, kiosks, products (e.g., wireless devices, accessories, home automation devices, virtual and/or augmented reality devices, gaming devices, etc.), displays (e.g., product and/or informational displays), and any other potential components of the virtual world. The modules in the world set of modules 202 may be defined to be independent of one another, without specific or rigidly-defined relationships (e.g., without specific defined spatial relationships) between the modules.

A module included in the world set of modules 202 may be defined to have specific properties. For example, a module may include properties indicating a fixed or adjustable size, shape, orientation, appearance, clearance space, module type (e.g., a wall type, a floor type, etc.), available module connection locations, and/or other properties of the module. To illustrate, a floor module may be defined to have a fixed shape and orientation, an adjustable size, a "floor" type categorization of module, and available module connection locations at certain positions on the floor module and at which other modules may be positioned on the floor module. Such module connection locations may be referred to as "spawn locations" and may indicate specific available positions at which other modules may be joined to a module.

A module included in the world set of modules 202 may be defined in any way suitable to upload and store the module in a data store as part of the world set of modules 202. For example, a module designer may design and upload the module to the data store and indicate that the module is to be included in the world set of modules 202.

Based on profile information 204 and a set of building rules 206, customization facility 104 may select a custom set of modules 208 from the world set of modules 202. The custom set of modules 208 may be a subset of the world set of modules 202 that has been custom-selected for inclusion in a custom 3D virtual world based on profile information 204 and building rules 206. Unselected modules in the world set of modules 202 will be omitted from the custom 3D virtual world.

Profile information 204 may include information associated with a user who is requesting to experience a virtual world. For example, profile information 204 may include information included in a profile for the user that is maintained by a wireless service provider. The information in the profile may indicate a wireless device and/or a wireless device type (e.g., brand, model, manufacturer, operating system, etc.) used by the user, products and/or services purchased by the user (e.g., a service subscription package), a purchase history of the user, geographic location information for the user, application installs by the user, privacy settings of the user, web browsing history of the user, social media history of the user, demographic information for the user, and/or any other information about the user.

Customization facility 104 may be configured to select modules for inclusion in the custom set of modules 208 based on profile information 204. As an example, profile information 204 may indicate a user preference for a particular type of wireless device, and, based on this preference, customization facility 104 may select a display module for the type of wireless device for inclusion in the custom set of modules 208 (e.g., a display module for wireless devices having a particular operating system or manufacturer). As another example, profile information 204 may indicate a history of the user interacting with a kiosk at a wireless service provider's physical store, and, based on this history, may select a kiosk module for inclusion in the custom set of modules 208. As another example, profile information may indicate that the user subscribes to a connected or smart home service, and, based on this subscription, may select a display module for connected or smart home devices for inclusion in the custom set of modules 208.

Customization facility 104 may be configured to select modules for inclusion in the custom set of modules 208 based on building rules 206. As an example, building rules 206 may specify that certain types of modules are required for a custom 3D virtual world. Accordingly, customization facility 104 may select required types of modules, such as a floor, walls, entryway, etc. for inclusion in the custom set of modules 208. As another example, building rules 206 may specify that certain types of modules are required or optional for an appearance of a custom 3D virtual world. Accordingly, customization facility 104 may select modules such as furniture, windows, light fixtures, etc. for inclusion in the custom set of modules 208.

Customization facility 104 may be configured to select modules for inclusion in the custom set of modules 208 based on a combination of profile information 204 and building rules 206. As an example, building rules 206 may specify that an entryway is required for a custom 3D virtual world. Accordingly, customization facility 104 may select an entryway module for inclusion in the custom set of modules 208. If the world set of modules 202 includes multiple different entryway modules, customization facility 104 may select a specific one of the entryway modules for inclusion in the custom set of modules 208 based on profile information 204. For example, profile information 204 may indicate that the user has visited a particular physical store of the wireless service provider in the past, and customization facility 104 may select an entryway module that virtually represents or shares visual characteristics of the entryway of the physical store. As another example, customization facility 104 may select specific furniture modules for inclusion in the custom set of modules 208 based on user profile demographic information for the user.

The above-described examples are for illustrative purposes. Customization facility 104 may be configured to base a selection of a module for inclusion in the custom set of modules 208 on any other information about the user and/or any other defined virtual world building rules.

Figure 3:
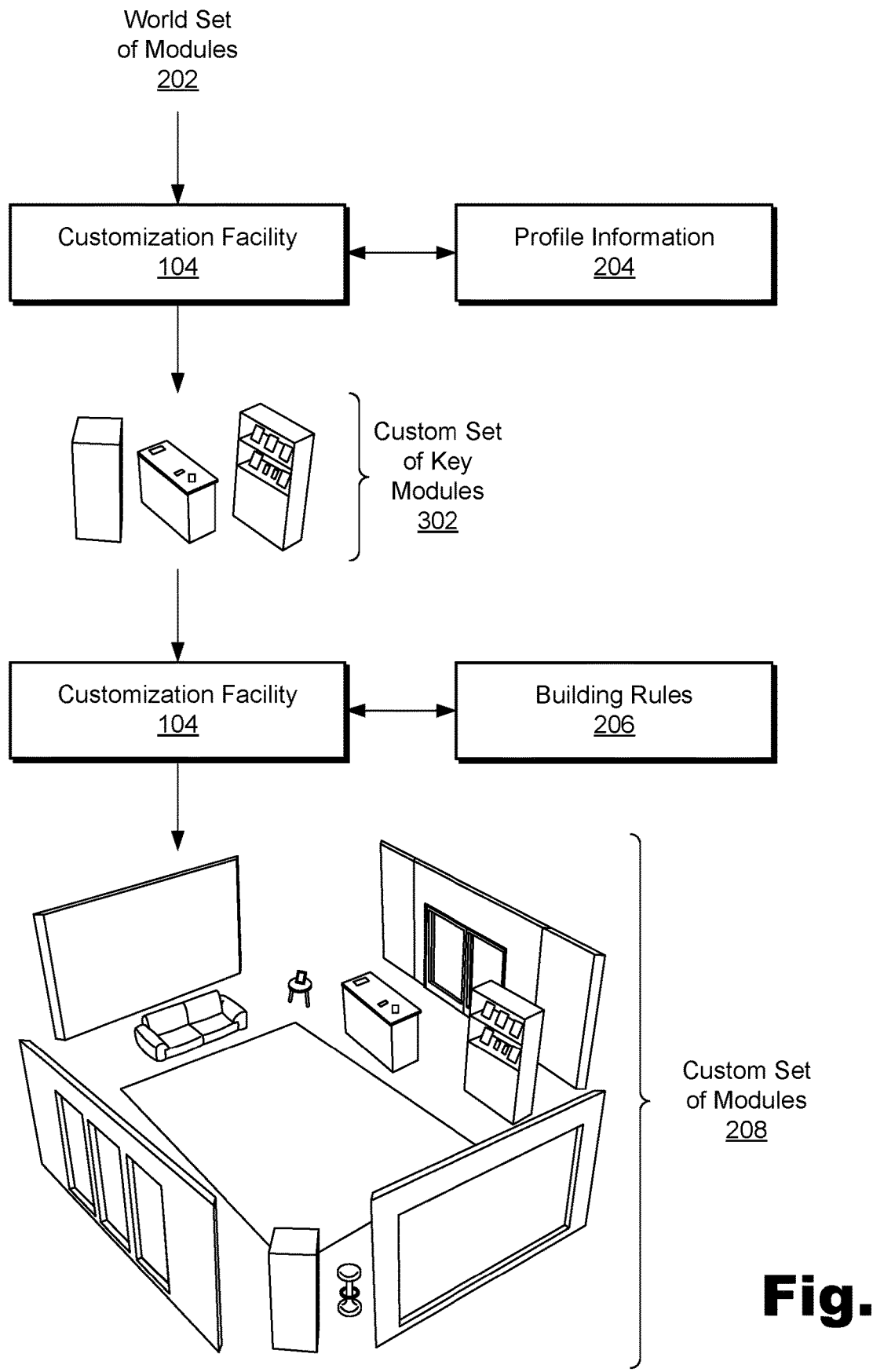
FIG. 3 illustrates an exemplary two-stage selection of a custom set of modules for inclusion in a custom 3D virtual world according to principles described herein.

In certain examples, customization facility 104 may be configured to select, for inclusion in the custom set of modules 208, a set of key modules based on profile information 204 and a set of additional modules based on building rules 206. FIG. 3 illustrates an exemplary two-stage selection of a custom set of modules for inclusion in a custom 3D virtual world. As shown, customization facility 104 may first select, from the world set of modules 202, a custom set of key modules 302 based on profile information 204. The custom set of key modules 302 may include modules selected for inclusion in the custom 3D virtual world based exclusively on profile information 204. For example, customization facility 104 may select, based on information about the user, a display module for a type of wireless device, a kiosk module, and a display module for home automation for inclusion in the custom set of key modules 302.

Customization facility 104 may use the custom set of key modules 302 to select, based on building rules 206, additional modules for inclusion together with the key modules in the custom set of modules 208. For example, customization facility 104 may select a floor module that provides an appropriate amount of floor space and/or a suitable layout to accommodate the selected key modules. Thus, a relatively larger or more spacious floor module may be selected to accommodate a relatively larger number of key modules, or a relatively smaller or less spacious floor module may be selected to accommodate a relatively smaller number of key modules. This example is for illustrative purposes. Selection of additional modules may be based on other suitable building rules 206.

While FIG. 3 illustrates customization facility 104 selecting additional modules based on building rules 206, in other examples, customization facility 104 may select additional modules based on both building rules 206 and profile information 204. For example, a module type may be selected by customization facility 104 based on building rules 206, and a particular instance or version of the module type may be selected by customization facility 104 based on profile information 204. To illustrate, customization facility 104 may select a particular entryway module based on a preference of a user indicated in profile information 204.

Figure 4:
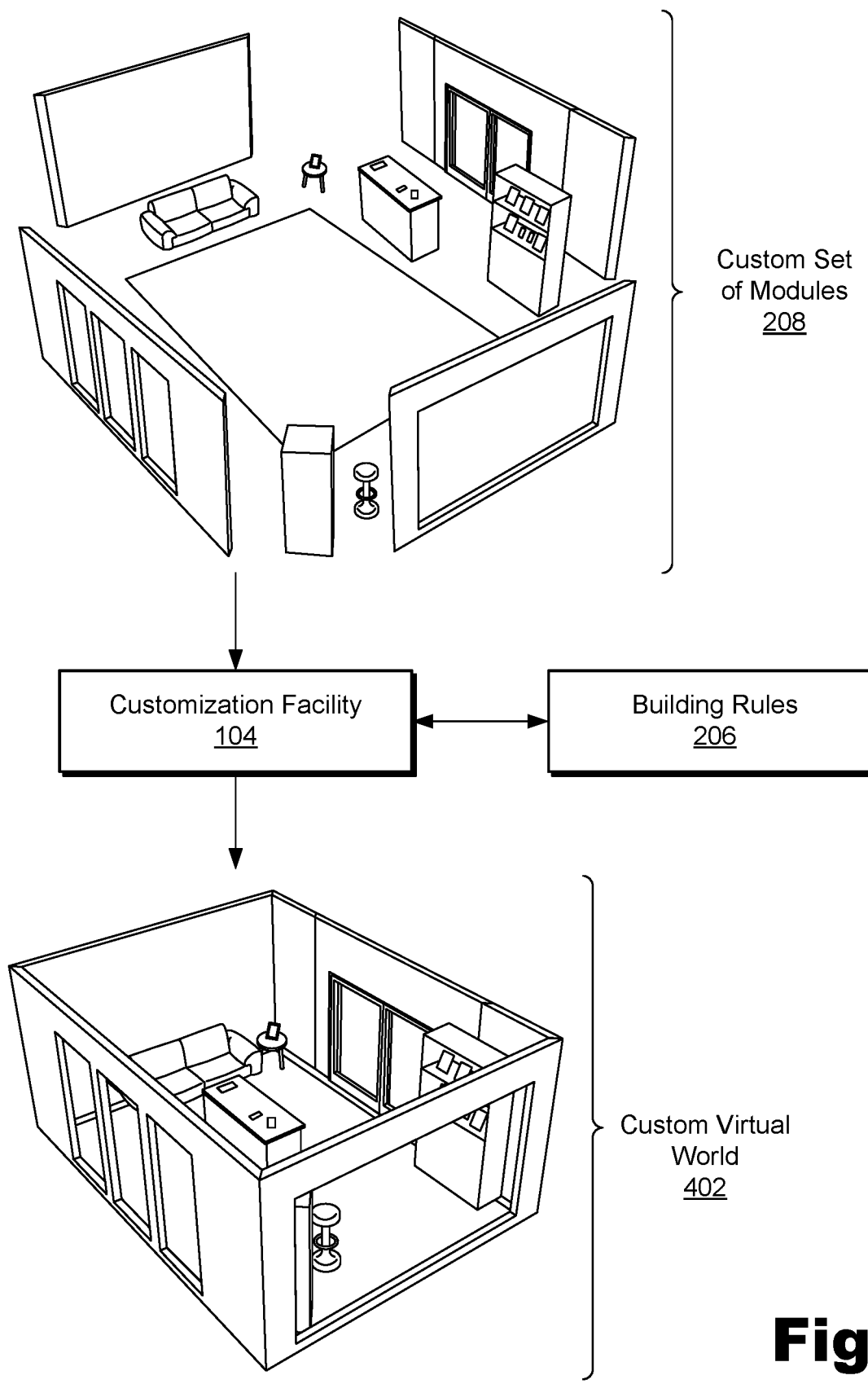
FIG. 4 illustrates an exemplary use of a custom set of modules to generate a custom 3D virtual world according to principles described herein.

Once customization facility 104 selects the custom set of modules 208, customization facility 104 uses the selected custom set of modules 208 to generate a custom virtual world based on building rules 206. FIG. 4 illustrates an exemplary use of a custom set of modules to generate a custom 3D virtual world. As shown, customization facility 104 may use the custom set of modules 208 to generate a custom virtual world 402 based on building rules 206. To this end, building rules 206 may specify rules for customization facility 104 to follow as customization facility 104 performs operations to combine the custom set of modules 208 together to form custom virtual world 402. For example, building rules 206 may specify space requirements for modules (e.g., a minimum open space required in front of and/or around an entryway, doorway, chair, stool, kiosk, or display module), how to select spawn locations at which modules will be joined (e.g., a floor module may have certain spawn positions available from which customization facility 104 may select which spawn positions to use), dimensional requirements, layout requirements, lighting requirements, physics-based requirements, aesthetic requirements, lounge/waiting area requirements, display position requirements, kiosk position requirements, entryway position requirements, position prioritization factors, and/or any other rules that may be useful for dynamically combining modules to form a custom virtual world such as custom virtual world 402.

In FIG. 4, custom virtual world 402 represents a wireless service provider virtual store customized for the user in one or more ways. For example, a specific display for a type of wireless device preferred by the user, a specific display for home automation devices, and a specific kiosk are included in custom virtual world 402 as a customization for the user. Additional modules in custom virtual world 402 may also be included as a customization for the user. For example, a particular entryway module, particular furniture, and/or walls with significant window space may be included as a customization for the user based on profile information 204.

The dynamic generation of custom 3D virtual world 402 may include customization facility 104 dynamically generating a 3D mesh that defines a structure of custom 3D virtual world 402. For example, the selected custom set of modules 208 may be used by customization facility 104 to generate a 3D mesh based on building rules 206 by positioning the selected custom set of modules 208 relative to one another within a 3D space to form custom virtual world 402. The 3D mesh may be a virtual mesh (e.g., a mesh of triangles and/or other virtual objects) that contours the surfaces of the virtual modules within custom virtual world 402. For example, the 3D mesh may represent a contour of the surfaces of the virtual objects within custom virtual world 402, such as a contour of the exposed inside surfaces of walls, windows, door, floor, and ceiling of custom virtual world 402 and the exposed surfaces of displays, kiosk, and furniture of custom virtual world 402. In certain examples, the 3D mesh may represent a depth map (e.g., a volumetric depth map) of custom 3D virtual world 402. In this way, the 3D mesh defines the structure of custom 3D virtual world 402. The 3D mesh may be a single, cohesive mesh for custom virtual world 402 in some examples. In other examples, the 3D mesh may include one or more 3D meshes for one or more portions of custom virtual world 402, which 3D meshes may be positioned relative to one another for define the structure of custom 3D virtual world 402.

The structure of custom 3D virtual world 402 defines a user-navigable virtual 3D space within the custom 3D virtual world 402. For example, the structure of custom 3D virtual world 402 includes virtual objects in the form of custom-selected modules arranged to form non-navigable components of the custom 3D virtual world 402 such as outer walls, floor, furniture (e.g., couch, stool, table), kiosk, and display modules through which a virtual vantage point and/or an avatar associated with the virtual vantage point is not allowed to pass. For instance, the virtual vantage point is not allowed to pass inside of the outer surfaces of a display module when a user is experiencing custom 3D virtual world 402. With the custom-selected modules positioned relative to one another in a 3D space, a user-navigable virtual 3D space is defined within the custom 3D virtual world 402. For example, custom 3D virtual world 402 includes modules arranged to form a virtual 3D space within a virtual store, and the virtual 3D space is navigable in that a user experiencing the custom 3D virtual world 402 is allowed to arbitrarily move a virtual vantage point to various positions within the virtual 3D space (e.g., within the inside volume of the virtual store). Thus, a 3D mesh for custom 3D virtual world 402 shown in FIG. 4 may define, and be a depth map of, the contour surfaces of the inside of the virtual store and thus the boundaries of the user-navigable 3D space inside the virtual store.

Figure 5:
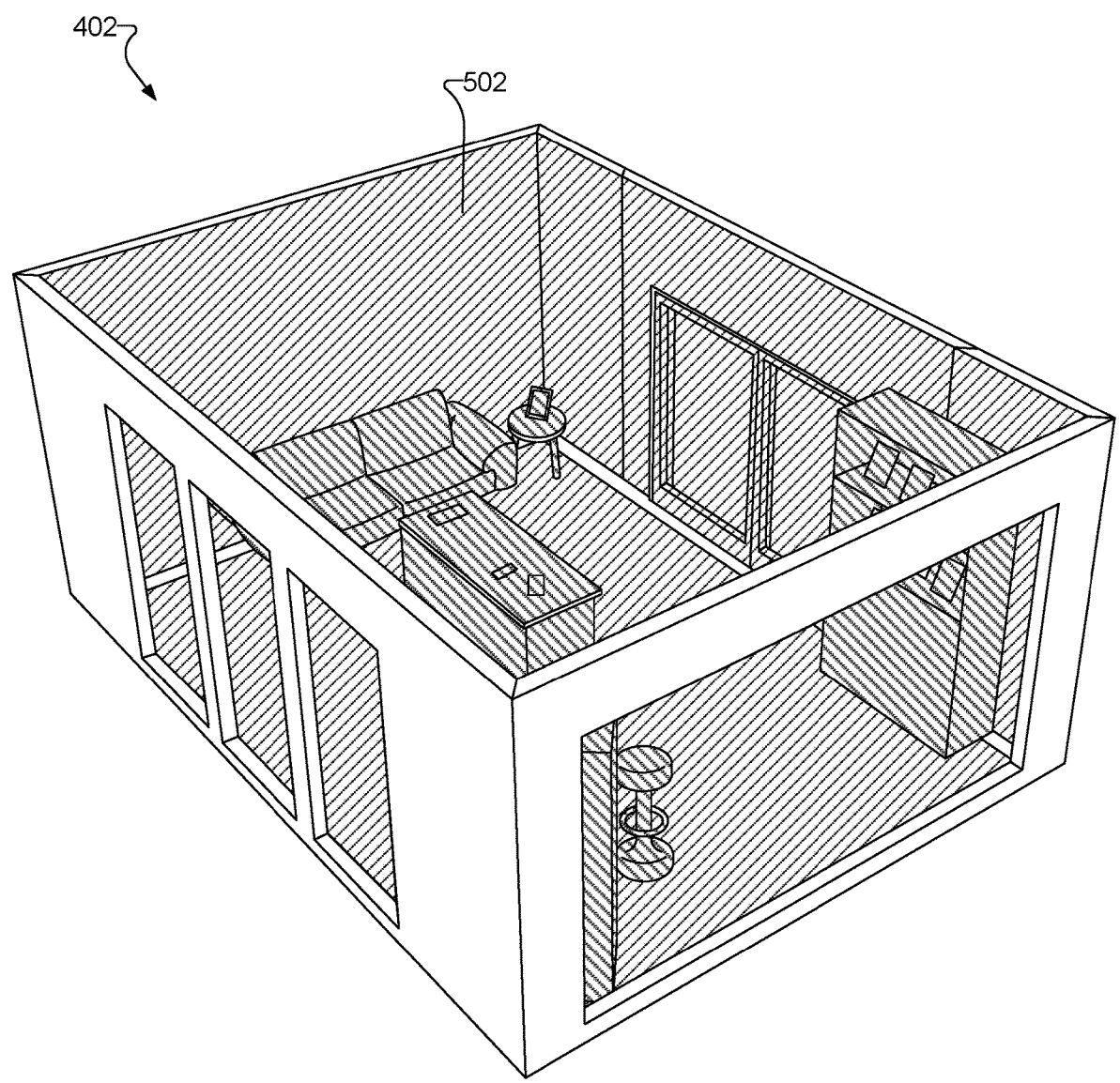
FIG. 5 illustrates an exemplary 3D mesh that defines a structure of a custom 3D virtual world according to principles described herein.

FIG. 5 illustrates an exemplary 3D mesh 502 that defines a structure of custom 3D virtual world 402. As shown, 3D mesh 502 is represented by patterns of diagonal lines forming a contour of virtual object surfaces inside of the custom virtual store of custom 3D virtual world 402.

Customization facility 104 may provide custom 3D virtual world 402 for experiencing by the user. For example, customization facility 104 may provide custom 3D virtual world 402 to communication facility 102, which may transmit data representative of custom 3D virtual world 402 to a user computing device configured to process the data and present custom 3D virtual world 402 to the user.

As mentioned, the dynamically-generated custom 3D virtual world 402 may be navigable by the user. For example, the user may provide input to the user computing device to arbitrarily move a virtual vantage point and/or field of view around within a 3D space of custom virtual world 402. In certain examples, an avatar for the user may be displayed within custom virtual world 402 and may be made to move (e.g., walk) within the 3D space of the custom virtual world 402 based on user input to correspondingly move the virtual vantage point and/or field of view around within custom virtual world 402.

Figure 6:
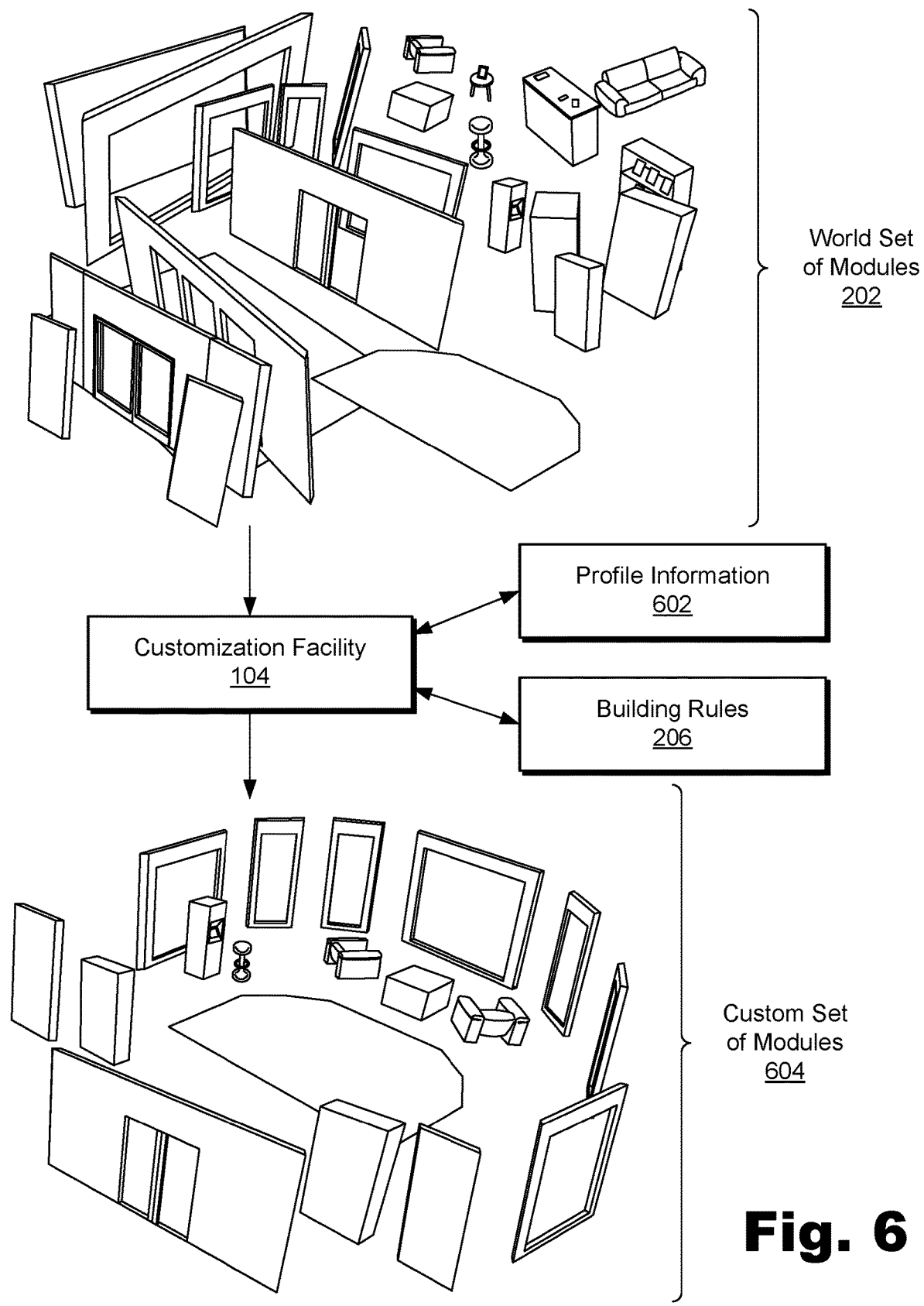
FIG. 6 illustrates an exemplary selection of another custom set of modules for inclusion in another custom 3D virtual world according to principles described herein.
Figure 7:
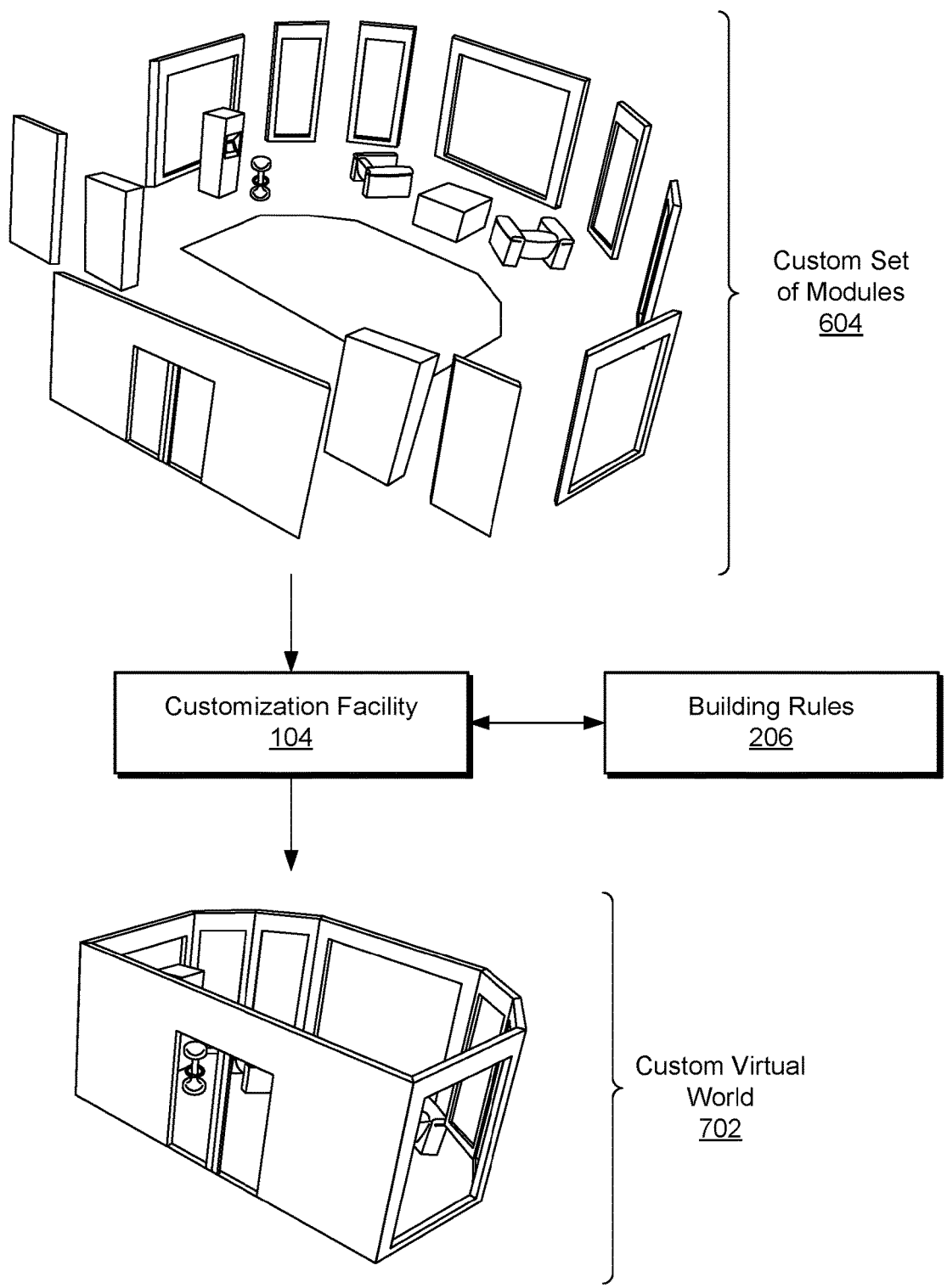
FIG. 7 illustrates an exemplary use of another custom set of modules to generate another custom 3D virtual world according to principles described herein.

FIG. 4 illustrates a particular custom virtual world 402 that may be dynamically generated from the world set of modules 202 based on particular profile information 204 for a user. Customization facility 104 may dynamically generate, from the same world set of modules 202, other custom virtual worlds based on other profile information for other users. The other custom virtual worlds may differ from custom virtual world 402 in one or more ways, including by having custom 3D meshes defining structures that differ from the structure of custom virtual world 402. FIGS. 6-7 illustrate an example of customization facility 104 dynamically generating an additional custom 3D virtual world, different from custom 3D virtual world 402, based on profile information for another user.

FIG. 6 illustrates an exemplary selection of an additional custom set of modules for inclusion in an additional custom 3D virtual world. As shown, based on profile information 602 for another user and on the set of building rules 206, customization facility 104 may select an additional custom set of modules 604 from the world set of modules 202. The additional custom set of modules 604 may be a different subset of the world set of modules 202 that has been custom-selected for inclusion in an additional custom 3D virtual world based on profile information 602 and building rules 206. The additional custom set of modules 604 selected from the world set of modules 202 as shown in FIG. 6 is different from the custom set of modules 208 selected from the world set of modules 202 as shown in FIG. 2. The differences between the custom sets of modules 208 and 604 may be attributed to the use of different profile information 204 and 602 to select the custom sets of modules 208 and 604.

Once customization facility 104 selects the additional custom set of modules 604, customization facility 104 uses the selected additional custom set of modules 604 to generate a custom virtual world based on building rules 206. FIG. 7 illustrates an exemplary use of the additional custom set of modules 604 to generate an additional custom 3D virtual world according to principles described herein. As shown, customization facility 104 may use the additional custom set of modules 604 to generate an additional custom virtual world 702 based on building rules 206.

In FIG. 7, custom virtual world 702 represents a wireless service provider virtual store customized for another user in one or more ways. For example, two specific wall-mounted displays and a specific kiosk custom-selected for the other user are included in custom virtual world 702 as a customization for the other user. Additional modules in custom virtual world 402 may also be included as a customization for the user. For example, a particular entryway module, particular furniture, and/or walls with significant window space may be included as a customization for the other user based on profile information 602.

The dynamic generation of custom 3D virtual world 702 may include customization facility 104 dynamically generating a 3D mesh that defines a structure of custom 3D virtual world 702. As illustrated in FIG. 7, the 3D mesh and the structure of custom 3D virtual world 702 are different, in one or more ways, from the 3D mesh and the structure of custom 3D virtual world 402 shown in FIG. 4. For example, at least the floor plan, wall positioning, entryway positioning, display positioning, kiosk positioning, and furniture positioning of custom virtual world 702 are different compared to custom virtual world 402.

In certain examples, system 100 may dynamically generate and provide multiple custom 3D virtual worlds on a single server session. For example, system 100 may dynamically generate and provide, on the same server session, custom 3D virtual world 402 to a first user computing device for experiencing by a first user and custom 3D virtual world 702 to a second user computing device for experiencing by a second user. Accordingly, during the server session, the first user may provide input to the first user computing device to navigate and experience custom 3D virtual world 402 being presented by the first user computing device, and the second user may provide input to the second user computing device to navigate and experience custom 3D virtual world 702 being presented by the second user computing device.

System 100 may be configured to connect multiple custom 3D virtual worlds that are on the same server session such that the connected custom 3D virtual worlds appear to be a cohesive virtual world. For example, system 100 may dynamically generate and provide a 3D virtual connection between the custom 3D virtual worlds on the same server session, such as a 3D virtual connection between custom 3D virtual worlds 402 and 702 being provided on the server session.

To this end, system 100 may provide custom 3D virtual worlds 402 and 702 within a common 3D space (e.g., a 3D space defined by a global 3D coordinate system) of the server session. Customization facility 104 may determine a spatial relationship between custom 3D virtual worlds 402 and 702 within the common 3D space, such as a spatial relationship between the entryways of custom 3D virtual worlds 402 and 702 within the common 3D space.

Based on the determined spatial relationship, one or more other attributes of custom 3D virtual worlds 402 and 702 (e.g., the sizes and/or orientations of the entryways of custom 3D virtual worlds 402 and 702), and/or profile information of users (e.g., profile information 204 and/or 502), customization facility 104 may select, from a defined world set of transition modules, a custom set of transition modules. Customization facility 104 may use the selected custom set of transition modules to generate a custom 3D virtual connection between custom 3D virtual worlds 402 and 702.

The world set of transition modules may be defined to be associated with the world set of modules 202 and may include a set of modules configured to be used by customization facility 104 to generate 3D virtual connections between custom virtual worlds that have been dynamically generated using modules selected from the world set of modules 202. In certain examples, the world set of transition modules may be separate from and associated with the world set of modules 202. In other examples, the world set of transition modules may be included within the world set of modules 202 and may include a subset of the world set of modules 202 that are labeled as transition-type modules.

Figure 8:
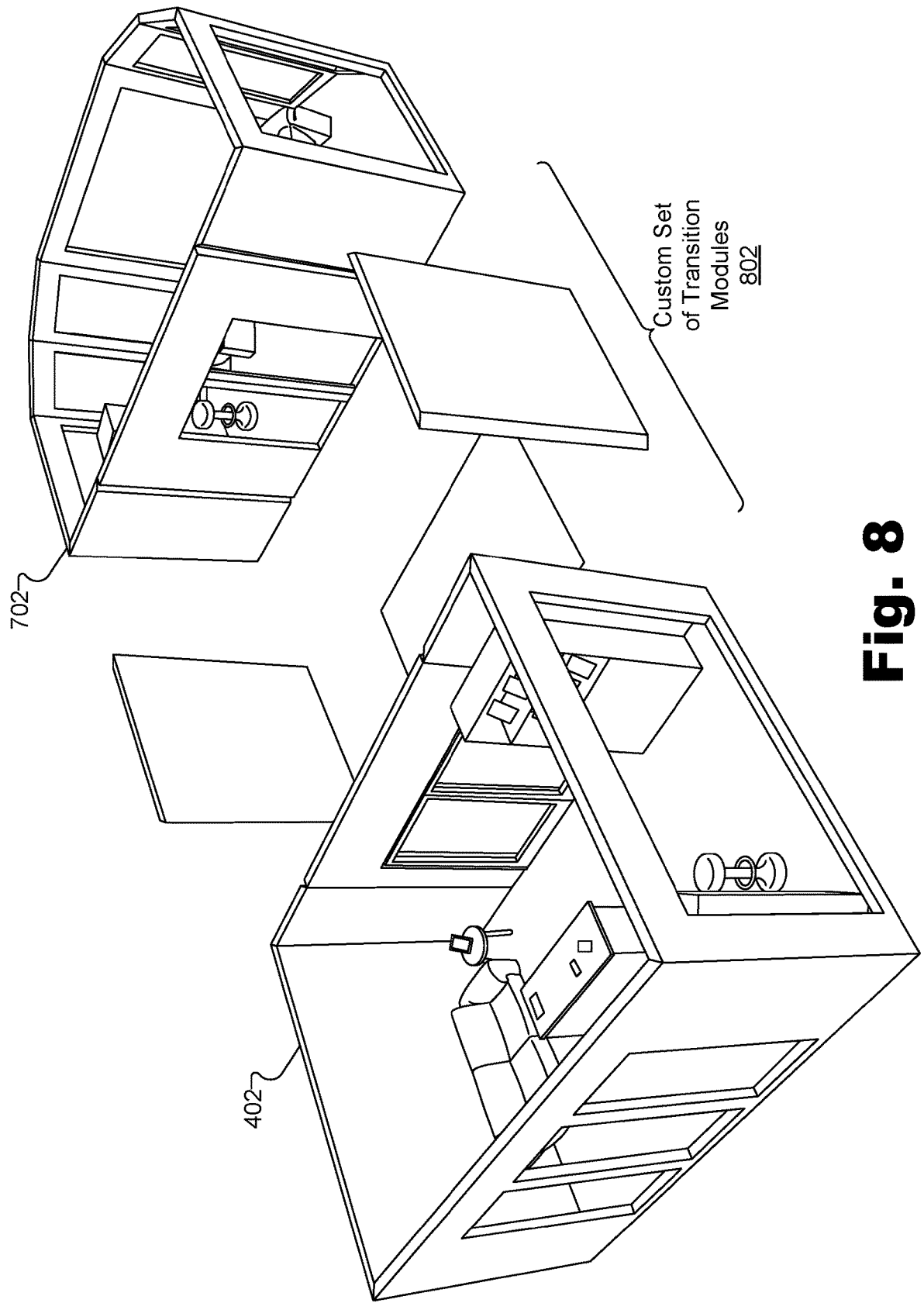
FIG. 8 illustrates a selected custom set of transition modules for use to generate a 3D virtual connection between different custom 3D virtual worlds according to principles described herein.
Figure 9:
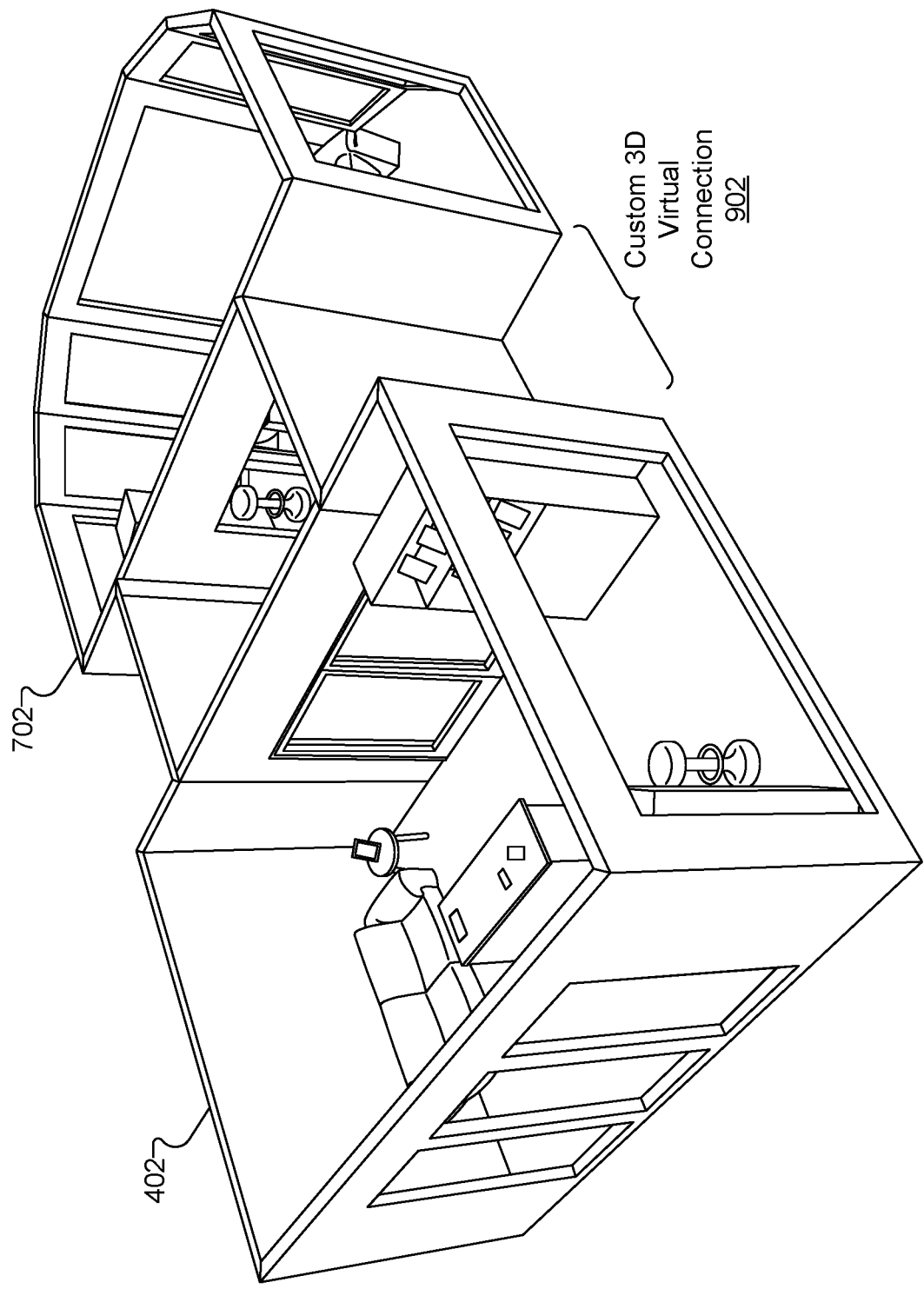
FIG. 9 illustrates a 3D virtual connection between different custom 3D virtual worlds according to principles described herein.

FIGS. 8-9 illustrate custom 3D virtual worlds 402 and 702 being presented in a single server session, within a common 3D space of the server session. As shown, empty space exists between the positions of custom 3D virtual worlds 402 and 702 within the 3D space. Customization facility 104 may determine the spatial relationship between custom 3D virtual worlds 402 and 702 within the 3D space and may generate and provide a custom 3D virtual connection that connects custom 3D virtual worlds 402 and 702 within the 3D space.

To this end, customization facility 104 may select and use a custom set of transition modules to generate the custom 3D virtual connection. FIG. 8 illustrates a selected custom set of transition modules 802 for use by customization facility 104 to generate a custom 3D virtual connection between custom 3D virtual worlds 402 and 702 within the 3D space. As shown, the custom set of transition modules 802 includes a floor module and two sidewall modules. In certain examples, customization facility 104 may select the custom set of transition modules 802, from a defined world set of transition modules, based on the determined spatial relationship between custom 3D virtual worlds 402 and 702 within the 3D space (e.g., a spatial relationship between entryways of custom 3D virtual worlds 402 and 702), one or more other attributes of custom 3D virtual worlds 402 and 702 (e.g., an appearance attribute, a theme attribute, a shape attribute, etc.), and/or profile information of users (e.g., profile information 204 and/or 502) associated with custom 3D virtual worlds 402 and 702.

Customization facility 104 may use the selected custom set of transition modules 802 to generate a custom 3D virtual connection between custom 3D virtual worlds 402 and 702 within the common 3D space of a server session, based on building rules 206. Building rules 206 may specify one or more rules to be followed by customization facility 104 for generate a custom 3D virtual connection between custom 3D virtual worlds. The rules may indicate any suitable requirements for building a virtual, user-navigable connection between custom 3D virtual worlds.

FIG. 9 illustrates a custom 3D virtual connection 902 connecting custom 3D virtual worlds 402 and 702 within the common 3D space of a server session. Customization facility 104 may generate custom 3D virtual connection 902 using the selected custom set of transition modules 802 and based on building rules 206. Custom 3D virtual connection 902 may define a navigable 3D space between custom 3D virtual worlds 402 and 702 that allows users associated with custom 3D virtual worlds 402 and 702 to provide input to respective user computing devices to move respective virtual vantage points within a cohesive custom virtual world that has been formed by connecting custom 3D virtual worlds 402 and 702 together with the custom 3D virtual connection 902. Accordingly, the users may move their respective avatars throughout the cohesive custom virtual world. For example, a first user associated with custom 3D virtual world 402 may provide input to move an avatar associated with the first user from custom 3D virtual world 402 to custom 3D virtual connection 902 and custom 3D virtual world 702 where a field of view associated with the first user's avatar may include custom 3D virtual world 702 and an avatar associated with a second user associated with custom 3D virtual world 702. Accordingly, the first and second users may interact with one another and with each other's custom 3D virtual world.

FIG. 9 illustrates custom 3D virtual connection 902 to be a straight hallway or portal between the entryways of custom 3D virtual worlds 402 and 702. This is for illustrative purposes. Other custom 3D virtual connections may have any suitable layout, terrain, appearance, and/or other suitable attributes. For example, a custom 3D virtual connection may include a stairway, an elevator, or other suitable connection between custom 3D virtual worlds. Customization facility 104 may be configured to generate a custom 3D virtual connection that provides an interesting, seamless, and/or fitting transition between custom 3D virtual worlds so as to facilitate a quality user experience with the custom 3D virtual connection.

Figure 10:
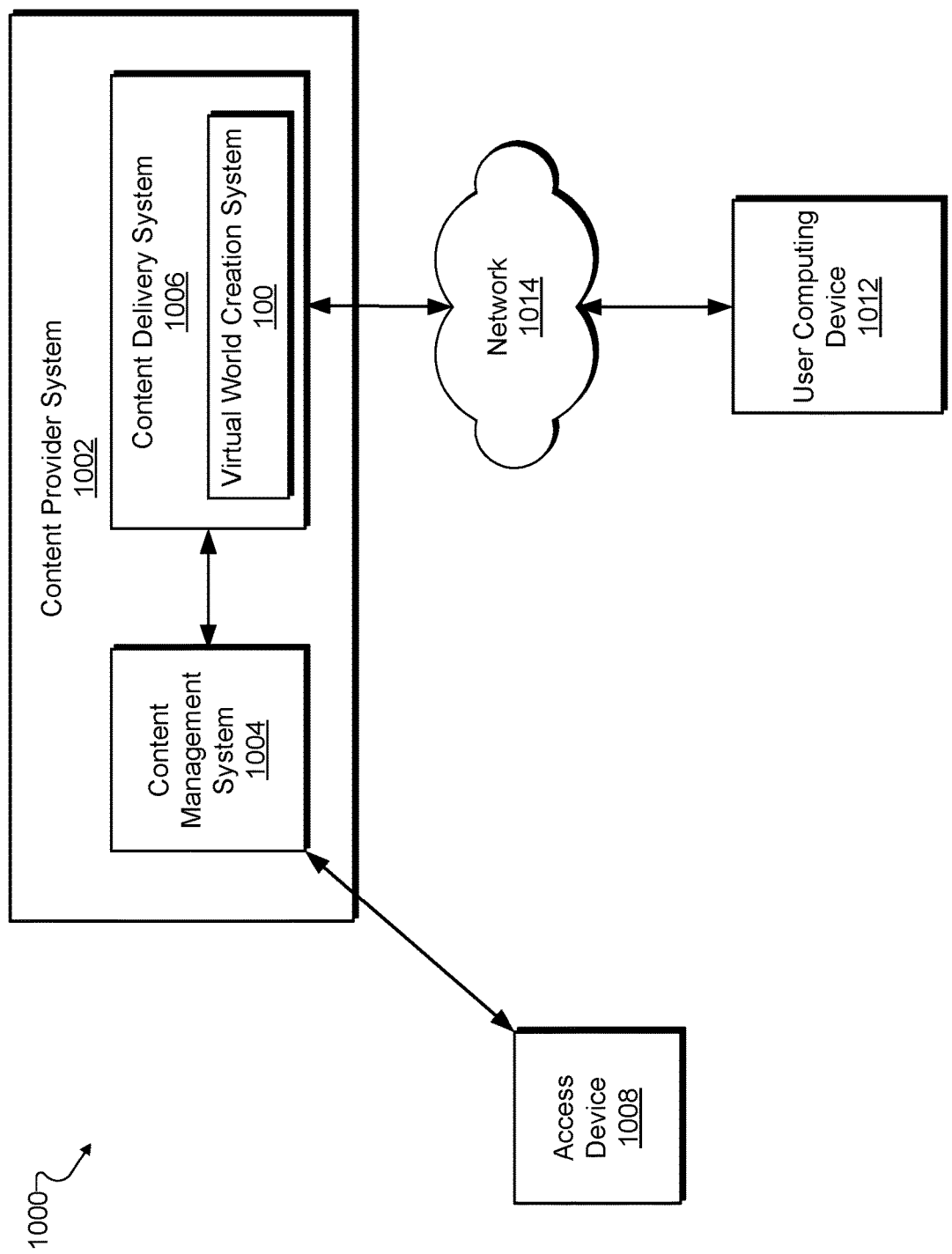
FIG. 10 illustrates an exemplary configuration for managing and delivering digital content such as a custom 3D virtual world according to principles described herein.

FIG. 10 illustrates an exemplary configuration 1000 of systems for managing and delivering digital content including virtual content dynamically generated by system 100 as described herein. As shown, configuration 1000 may include a content provider system 1002 that implements a content management system 1004 and a content delivery system 1006 communicatively coupled one to another. Content management system 1004 and content delivery system 1006 may each include one or more computing devices, such as one or more server devices, data storage devices, processors, etc., configured (e.g., by instructions tangibly embodied as software, firmware, etc. in a computer-readable medium) to perform operations of content management system 1004 and content delivery system 1006 described herein.

Content management system 1004 may manage digital content in any of the ways described herein, including receiving, processing, storing, and providing digital content. For example, content management system 1004 may receive digital content from any suitable source, such as from an access device 1008 communicatively coupled to content management system 1004, process the digital content, and store the digital content in a data repository (e.g., a database) from which the digital content is made accessible to access device 1008 and/or content delivery system 1006. Content management system 1004 may store the digital content in a specific hierarchical data format in which the digital content is represented by a plurality of nodes and hierarchical relationships between the nodes in a graph database.

The digital content managed by content management system 1004 may include a world set of modules for a virtual world, such as the world set of modules 202. For example, a user of access device 1008, such as a designer or developer, may create and upload modules for a virtual world to content management system 1004. A module included in the world set of modules 202 may be defined in any way suitable to upload and store the module in content management system 1004 as part of a particular world set of modules for a virtual world. For example, a module designer may design and upload the module to content management system 1004 and indicate that the module is to be included in the world set of modules 202.

Content management system 1004 may provide digital content to content delivery system 1006 for use by content delivery system 1006 to generate and deliver custom digital content over a network. As shown, content delivery system 1006 may implement system 100. Accordingly, content delivery system 1006 may perform one or more of the operations described herein to dynamically generate and provide custom 3D virtual content, such as one or more custom 3D virtual worlds and/or custom 3D virtual connections for experiencing by one or more users. To this end, content delivery system 1006 may be configured to transmit generated custom digital content to one or more client devices, such as a user computing device 1012, over a network 1014.

User computing device 1012 may request digital content from content delivery system 1006 (e.g., content representing a virtual world), receive the requested digital content from content delivery system 1006, and process the digital content to provide a user experience based on the digital content. In certain examples, user computing device 1012 may use the digital content to provide a user experience to a user of user computing device 1012, such as by displaying and/or playing visual and/or audible digital content in certain examples.

In certain examples, content delivery system 1006 may be configured to receive a request from a user of user computing device 1012 to experience a virtual world. In response to the request, content delivery system 1006 may dynamically generate and provide a custom 3D virtual world to user computing device 1012 for presentation by user computing device 1012 and experiencing by the user of user computing device 1012. The providing of the custom 3D virtual world may include streaming content representative of the custom 3D virtual world form content delivery system 1006 to user computing device 1012 in real time and/or during a server session between content delivery system 1006 and user computing device 1012.

In certain examples, content delivery system 1006 may be implemented using an edge computing architecture, such as a mobile edge computing architecture. The use of such an architecture may help provide data transmission speed, throughput, and/or latency to support dynamic and/or real time generation and providing of custom 3D virtual content to user computing device 112. Other suitable content delivery architectures may be used in other implementations.

In certain examples, content delivery system 1006 may be configured to cache and stage a dynamically-generated custom 3D virtual world for access by one or more disparate users. For example, a custom 3D virtual world dynamically generated for one user may be staged such that the custom 3D virtual world is persistent and available for access by and/or sharing with (e.g., broadcast to) one or more other users.

In certain examples, content provider system 1002 may be configured to propagate updates made to digital content via access device 1008 into presented digital content in real time (e.g., into digital content accessed and presented by user computing device 1012). For example, a user may upload a new or updated module to content management system 1004 by way of access device 1008. Content provider system 1002 may propagate the new or updated module to content delivery system 1006 in real time for use in generating and providing digital content to user computing device 1012. For instance, the new or updated module may be provided to content delivery system 1006 and added to a world set of defined modules for use by system 100 to dynamically generate a custom 3D virtual world from the world set of defined modules.

While certain examples of custom 3D virtual worlds have been described in detail herein, the examples used are for illustrative purposes. Principles described herein may similarly apply to additional or alternative examples of custom 3D virtual worlds, such as custom 3D virtual worlds designed for training purposes (e.g., users may start a training session in a common virtual classroom and then separate into different training sessions that are custom-built for the users based on profile information for the users), 3D virtual worlds of trade show booths, 3D virtual worlds of sporting events, etc.

A custom 3D virtual world described herein may be used in any suitable context and/or application. For example, such a custom 3D virtual world may be used in an extended reality experience, such as a virtual reality experience and/or an augmented reality experience (e.g., as a virtual world that is accessible to a user by way of a virtual world portal that is presented as augmented reality content).

Figure 11:
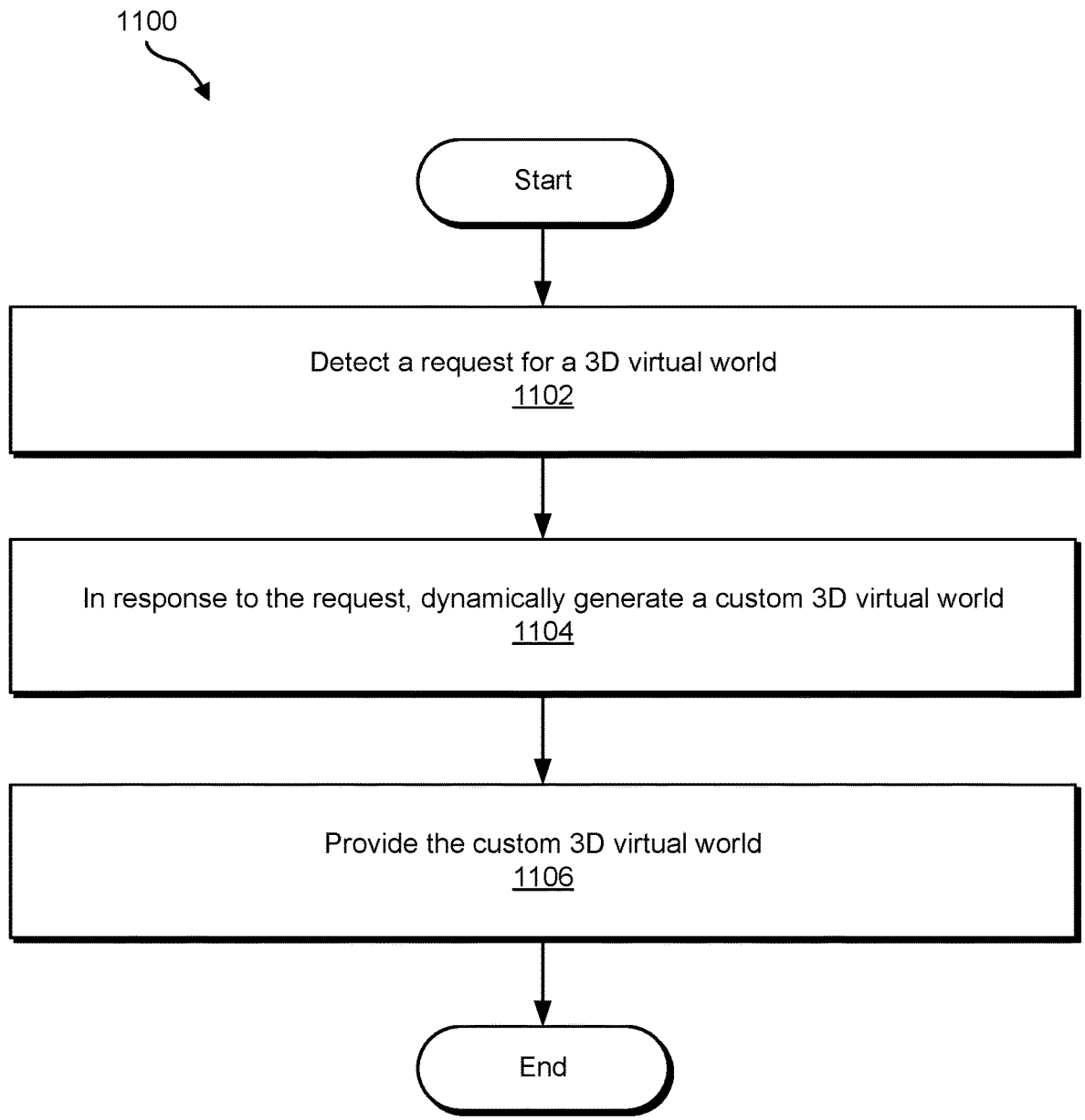
FIG. 11-12 illustrate exemplary virtual world creation methods according to principles described herein.
Figure 12:
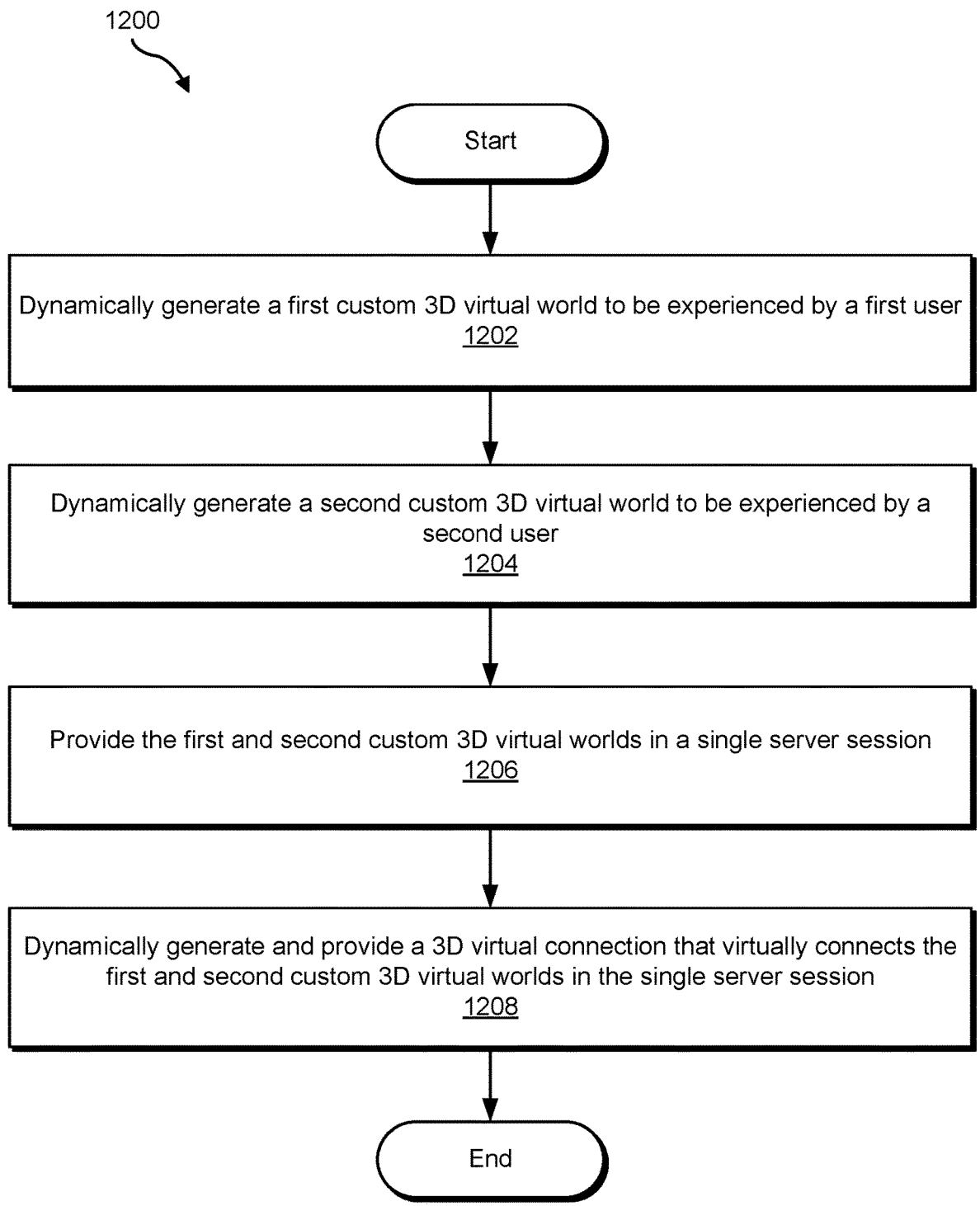

FIGS. 11-12 illustrate exemplary virtual world created methods according to principles described herein. While FIGS. 11-12 illustrate exemplary operations according to certain embodiments, other embodiments may omit, add to, reorder, and/or modify any of the operations shown in FIGS. 11-12. One or more of the operations shown in FIGS. 11-12 may be performed by a system described herein (e.g., system 100) and/or any component(s) or implementation(s) thereof.

Turning to method 1100 shown in FIG. 11, in operation 1102, a virtual world creation system detects a request for a 3D virtual world. Operation 1102 may be performed in any of the ways described herein. For example, system 100 may detect a request from a user of a user computing device to experience a 3D virtual world.

In operation 1104, in response to the request detected in operation 1102, the virtual world creation system dynamically generates a custom 3D virtual world. Operation 1104 may be performed in any of the ways described herein. For example, system 100 may dynamically generating the custom 3D virtual world in any of the ways described herein, such as by selecting a custom set of modules based on profile information for a user and a set of virtual world building rules and using the selected custom set of modules to generate, based on the set of virtual world building rules, a 3D mesh that defines a structure of the custom 3D virtual world.

In operation 1106, the virtual world creation system provides the custom 3D virtual world. Operation 1106 may be performed in any of the ways described herein. For example, system 100 may provide the custom 3D virtual world for experiencing by the user, such as by transmitting data representative of the custom 3D virtual world to a user computing device for presentation by the user computing device.

Method 1100 may be repeated one or more times to dynamically generate and provide one or more additional custom 3D virtual worlds in response to one or more additional requests from one or more additional users.

Turning now to method 1200 shown in FIG. 12, in operation 1202, a virtual world creation system dynamically generates a first custom 3D virtual world to be experienced by a first user. Operation 1202 may be performed in any of the ways described herein. For example, system 100 may dynamically generate a first custom 3D virtual world (e.g., custom 3D virtual world 402) as described herein.

In operation 1204, the virtual world creation system dynamically generates a second custom 3D virtual world to be experienced by a second user. Operation 1204 may be performed in any of the ways described herein. For example, system 100 may dynamically generate a second custom 3D virtual world (e.g., custom 3D virtual world 702) as described herein.

In operation 1206, the virtual world creation system provides the first and second custom 3D virtual worlds in a single server session. Operation 1206 may be performed in any of the ways described herein. For example, system 100 may provide content associated with the single server session to a first user computing device of the first user and a second user computing device of the second user. The first user may experience the first custom 3D virtual world during the single server session, and the second user may experience the second custom 3D virtual world during the single server session.

In operation 1208, the virtual world creation system dynamically generates and provides a 3D virtual connection that virtually connects the first and second custom 3D virtual worlds in the single server session. Operation 1208 may be performed in any of the ways described herein. For example, system 100 may determine a spatial relationship between the first and second custom 3D virtual worlds in a common 3D space of the single server session and may generate the 3D virtual connection (e.g., a custom 3D virtual connection) based at least in part on the determined spatial relationship.

With the first custom 3D virtual world, the second custom 3D virtual world, the connecting 3D virtual connection provided in the single server session in this manner, a cohesive custom 3D virtual world is formed that is navigable by each of the first user and the second user during the single server session, as described herein. Accordingly, the first user and the second user may each independently navigate to and experience any part of the cohesive custom 3D virtual world, potentially making the single server session a multi-presence experience.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor, a CPU, a GPU, etc.) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 13:
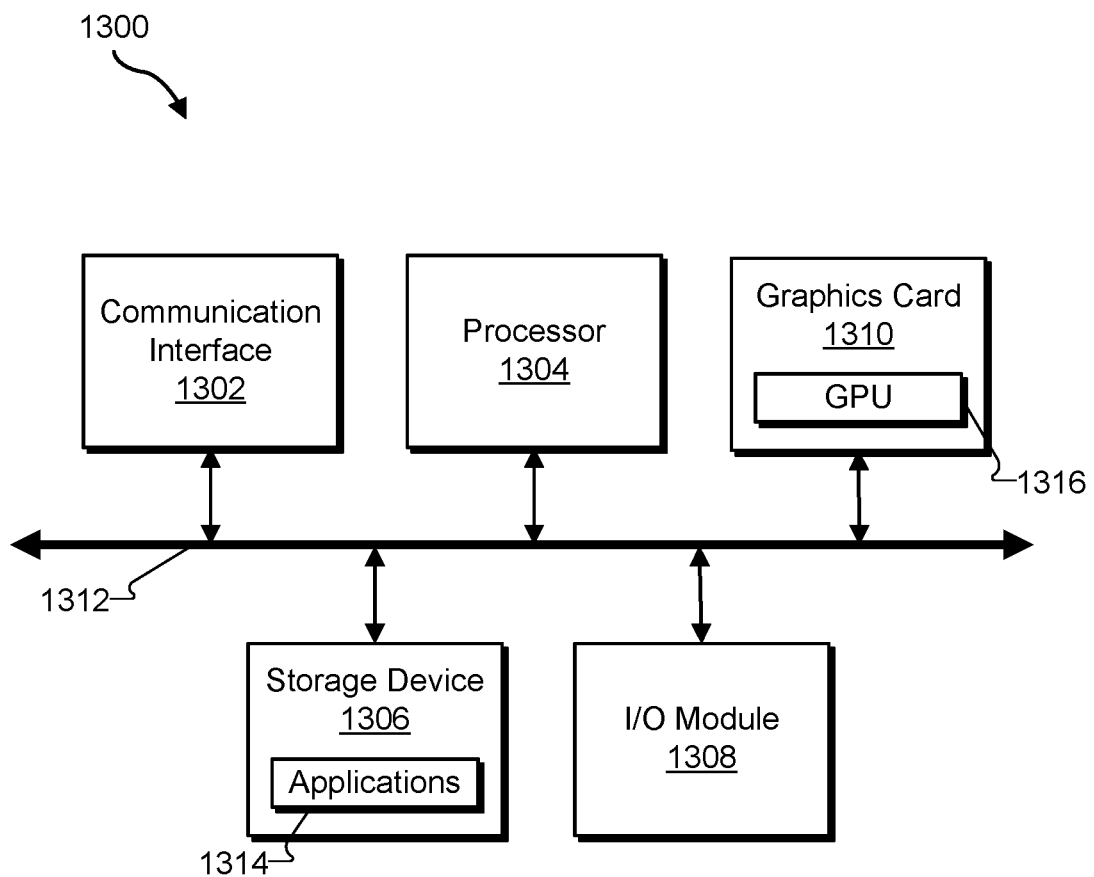
FIG. 13 illustrates an exemplary computing device according to principles described herein.

FIG. 13 illustrates an exemplary computing device 1300 that may be specifically configured to perform one or more of the processes described herein. As shown in FIG. 13, computing device 1300 may include a communication interface 1302, a processor 1304, a storage device 1306, an input/output ("I/O") module 1308, and a graphics card 1310 communicatively connected via a communication infrastructure 1312. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit (e.g., a CPU) capable of processing data or interpreting, executing, and/or directing execution of one or more of the instructions, processes, and/or operations described herein. Processor 1304 may direct execution of operations in accordance with one or more applications 1314 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1306. For example, data representative of one or more executable applications 1314 configured to direct processor 1304 to perform any of the operations described herein may be stored within storage device 1306. In some examples, data may be arranged in one or more databases residing within storage device 1306. In certain examples, storage device 1306 may maintain surface data, metadata, data streams, video streams, transport streams, and/or any other data received, generated, managed, maintained, used, and/or transmitted by facilities 106 through 116. The storage facility may further include any other data as may be used by facilities 106 through 116 to perform one of more of the operations described herein.

I/O module 1308 may include one or more I/O modules configured to receive user input and provide user output. One or more I/O modules may be used to receive input for a single virtual reality experience. I/O module 1308 may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation. I/O module 1308 may be omitted from certain implementations.

In some examples, any of the system components described herein may be implemented by or within one or more components of computing device 1300. For example, one or more applications 1314 residing within storage device 1306 may be configured to direct processor 1304 to perform one or more processes or functions associated with communication facility 102 and/or customization facility 104. Likewise, any suitable storage facility associated with system 100 may be implemented by or within storage device 1306. Accordingly, computing device 1300 may represent an exemplary implementation of system 100 and/or content delivery system 906.

Graphics card 1310 may include any suitable graphics card (e.g., a commercially available graphics card) having dedicated video decoding hardware (e.g., one or more dedicated video decoders) and optionally a programmable GPU 1316. Graphics card 1310 may include additional components in certain embodiments. Graphics card 1310 and/or GPU 1316 may be configured to execute and/or assist processor 1304 in executing one or more of the exemplary operations described herein. Graphics card 1310 may include any suitable number of graphics cards and/or GPUs as may suit a particular implementation.

Certain operations are described herein as being able to be performed in real time in some examples. Operations may be performed in real time or near real time when they are performed immediately and without undue delay such that, for example, data processing operations associated with an ongoing event (e.g., a content streaming event) are performed without undue delay even if there is some amount of processing delay.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a virtual world creation system, a request from a user of a user computing device to experience a three-dimensional (3D) virtual world; and
   dynamically generating, by the virtual world creation system in response to the request, a 3D mesh that defines a structure of a custom 3D virtual world to be experienced by the user, the generating comprising
      selecting, based on profile information for the user and a set of virtual world building rules, a custom set of modules for inclusion in the custom 3D virtual world, the custom set of modules including connection locations on the modules to indicate specific available positions at which the modules may be joined to one another, and using the selected custom set of modules to generate the 3D mesh based on the set of virtual world building rules by positioning the modules of the selected custom set relative to one another to define a user-navigable virtual 3D space; and providing, by the virtual world creation system, the custom 3D virtual world for experiencing by the user.

2. The method of claim 1, wherein the providing of the custom 3D virtual world for experiencing by the user comprises streaming, in real time in response to the request, data representative of the dynamically generated custom 3D virtual world over a network to the user computing device.

3. The method of claim 1, further comprising:

detecting, by the virtual world creation system, an additional request from an additional user of an additional user computing device to experience the 3D virtual world; and dynamically generating, by the virtual world creation system in response to the additional request, an additional 3D mesh that defines a structure of an additional custom 3D virtual world to be experienced by the additional user, the structure of the additional custom 3D virtual world different from the structure of the custom 3D virtual world, the generating comprising selecting, based on profile information for the additional user and the set of virtual world building rules, an additional custom set of modules for inclusion in the additional custom 3D virtual world, and using the selected additional custom set of modules to generate the additional 3D mesh based on the set of virtual world building rules; and providing, by the virtual world creation system, the additional custom 3D virtual world for experiencing by the additional user.

4. The method of claim 3, further comprising:

providing, by the virtual world creation system, the custom 3D virtual world and the additional custom 3D virtual world in a single server session; and generating, by the virtual world creation system, a 3D virtual connection between the custom 3D virtual world and the additional custom 3D virtual world in the single server session, the 3D virtual connection configured to facilitate virtual navigation by the user or the additional user between the custom 3D virtual world and the additional custom 3D virtual world.

5. The method of claim 4, wherein the dynamically generating of the 3D virtual connection comprises:

determining a spatial relationship between the custom 3D virtual world and the additional custom 3D virtual world within a common 3D space associated with the single server session; and generating the 3D virtual connection based on the determined spatial relationship.

6. The method of claim 1, wherein the selecting of the custom set of modules for inclusion in the custom 3D virtual world comprises:

selecting, based on the profile information for the user, a set of key modules for inclusion in the custom 3D virtual world; and selecting, based on the selected set of key modules and the set of virtual world building rules, a set of additional modules for inclusion in the custom 3D virtual world.

7. The method of claim 1, embodied as computer-executable instructions on at least one non-transitory computer-readable medium.

8. A method comprising:

dynamically generating, by a virtual world creation system in response to a first request to access a virtual world, a first custom 3D virtual world to be experienced by a first user, dynamically generating the first custom 3D virtual world comprising:

selecting, from a world set of modules based on first profile information for the first user and a set of virtual world building rules, a first custom set of modules for inclusion in the first custom 3D virtual world, the first custom set of modules including connection locations on the modules to indicate specific available positions at which the modules may be joined to one another, and using the selected first custom set of modules to generate, based on the set of virtual world building rules, a first 3D mesh that defines a structure of the first custom 3D virtual world;

dynamically generating, by the virtual world creation system in response to a second request to access the virtual world, a second custom 3D virtual world to be experienced by a second user;

providing, by the virtual world creation system, the first custom 3D virtual world and the second custom 3D virtual world in a single server session; and dynamically generating and providing, by the virtual world creation system in the single server session, a custom 3D virtual connection that virtually connects the first custom 3D virtual world and the second custom 3D virtual world to form a cohesive 3D virtual world that includes the first custom 3D virtual world, the second custom 3D virtual world, and the custom 3D virtual connection, wherein the cohesive 3D virtual world is navigable by each of the first user and the second user during the single server session.

9. The method of claim 8, wherein the generating of the second custom 3D virtual world to be experienced by the second user comprises:

selecting, from the world set of modules based on second profile information for the second user and the set of virtual world building rules, a second custom set of modules for inclusion in the second custom 3D virtual world; and using the selected second custom set of modules to generate, based on the set of virtual world building rules, a second 3D mesh that defines a structure of the second custom 3D virtual world, the second 3D mesh different from the first 3D mesh.

10. The method of claim 8, wherein the selecting of the first custom set of modules for inclusion in the first custom 3D virtual world comprises:

selecting, based on the first profile information for the first user, a set of key modules for inclusion in the first custom 3D virtual world; and selecting, based on the selected set of key modules and the set of virtual world building rules, a set of additional modules for inclusion in the custom 3D virtual world.

11. The method of claim 8, wherein the dynamically generating of the custom 3D virtual connection comprises:

determining a spatial relationship between the first custom 3D virtual world and the second custom 3D virtual world within a common 3D space associated with the single server session; and generating the custom 3D virtual connection based on the determined spatial relationship.

12. The method of claim 8, embodied as computer-executable instructions on at least one non-transitory computer-readable medium.

13. A system comprising:
a processor; and
a non-transitory computer-readable medium communicatively coupled to the processor and storing instructions executable by the processor to:
  detect a request from a user of a user computing device to experience a three-dimensional (3D) virtual world;
  dynamically generate, in response to the request, a 3D mesh that defines a structure of a custom 3D virtual world to be experienced by the user, the generation of the 3D mesh comprising
    selecting, based on profile information for the user and a set of virtual world building rules, a custom set of modules for inclusion in the custom 3D virtual world, the custom set of modules including connection locations on the modules to indicate specific available positions at which the modules may be joined to one another, and
    using the selected custom set of modules to generate the 3D mesh based on the set of virtual world building rules by positioning the modules of the selected custom set relative to one another to define a user-navigable virtual 3D space; and
  provide the custom 3D virtual world for experiencing by the user.

14. The system of claim 13, wherein the instructions are executable by the processor to provide the custom 3D virtual world for experiencing by the user by streaming, in real time in response to the request, data representative of the dynamically generated custom 3D virtual world over a network to the user computing device.

15. The system of claim 13, wherein the instructions are executable by the processor to:
  detect, an additional request from an additional user of an additional user computing device to experience the 3D virtual world; and
  dynamically generate, in response to the additional request, an additional 3D mesh that defines a structure of an additional custom 3D virtual world to be experienced by the additional user, the structure of the additional custom 3D virtual world different from the structure of the custom 3D virtual world, the generation of the additional 3D mesh comprising
    selecting, based on profile information for the additional user and the set of virtual world building rules, an additional custom set of modules for inclusion in the additional custom 3D virtual world, and
    using the selected additional custom set of modules to generate the additional 3D mesh based on the set of virtual world building rules; and
  provide the additional custom 3D virtual world for experiencing by the additional user.

16. The system of claim 15, wherein the instructions are executable by the processor to:
  provide the custom 3D virtual world and the additional custom 3D virtual world in a single server session; and
  generate a 3D virtual connection between the custom 3D virtual world and the additional custom 3D virtual world in the single server session, the 3D virtual connection configured to facilitate virtual navigation by the user or the additional user between the custom 3D virtual world and the additional custom 3D virtual world by way of the 3D virtual connection.

17. The system of claim 16, wherein the instructions are executable by the processor to generate the 3D virtual connection by:
  determining a spatial relationship between the custom 3D virtual world and the additional custom 3D virtual world within a common 3D space associated with the single server session; and
  generating the 3D virtual connection based on the determined spatial relationship.

18. The system of claim 13, wherein the instructions are executable by the processor to select the custom set of modules for inclusion in the custom 3D virtual world by:
  selecting, based on the profile information for the user, a set of key modules for inclusion in the custom 3D virtual world; and
  selecting, based on the selected set of key modules and the set of virtual world building rules, a set of additional modules for inclusion in the custom 3D virtual world.

* * * * *